(12) United States Patent
Perriello

(10) Patent No.: US 7,192,523 B2
(45) Date of Patent: Mar. 20, 2007

(54) METHODS FOR TREATING AGRICULTURAL WASTE AND PRODUCING PLANT GROWTH-ENHANCING MATERIAL

(75) Inventor: Felix Anthony Perriello, Norwood, MA (US)

(73) Assignee: Global BioSciences, Inc., North Attleborough, MA (US)

( * ) Notice: Subject to any disclaimer, the term of this patent is extended or adjusted under 35 U.S.C. 154(b) by 137 days.

(21) Appl. No.: 10/674,154

(22) Filed: Sep. 29, 2003

(65) Prior Publication Data

US 2004/0124137 A1 Jul. 1, 2004

Related U.S. Application Data

(63) Continuation-in-part of application No. 10/400,963, filed on Mar. 27, 2003, which is a continuation-in-part of application No. 10/308,607, filed on Dec. 2, 2002, which is a continuation-in-part of application No. 10/282,891, filed on Oct. 29, 2002, which is a continuation-in-part of application No. 09/924,791, filed on Aug. 8, 2001, now Pat. No. 6,669,846, which is a continuation-in-part of application No. 09/729,039, filed on Dec. 4, 2000, now Pat. No. 6,488,850, which is a continuation-in-part of application No. 09/275,320, filed on Mar. 24, 1999, now Pat. No. 6,245,235, which is a continuation-in-part of application No. 08/767,750, filed on Dec. 17, 1996, now Pat. No. 5,888,396.

(60) Provisional application No. 60/291,165, filed on May 15, 2001, provisional application No. 60/234,482, filed on Sep. 22, 2000, provisional application No. 60/334,981, filed on Oct. 31, 2001.

(51) Int. Cl.
*C02F 3/00* (2006.01)

(52) U.S. Cl. .................................... 210/610; 210/620
(58) Field of Classification Search ............... 210/610, 210/620
See application file for complete search history.

(56) References Cited

U.S. PATENT DOCUMENTS 2,474,833 A 7/1949 Eweson (Continued)

FOREIGN PATENT DOCUMENTS

DE 4142063 12/1991

(Continued)

OTHER PUBLICATIONS

CRC Handbook of Chemistry and Physics, 59th Edition, 1978, at p. F-210.*

(Continued)

*Primary Examiner*—Chester T. Barry
(74) *Attorney, Agent, or Firm*—Alan G. Towner, Esq.; Pietragallo, Bosick & Gordon LLP

(57) ABSTRACT

Methods and apparatus are provided for treating agricultural waste with an alkane substrate to stimulate bacterial digestion. The alkane treatment may also reduce odor of the agricultural waste material. The agricultural waste may include animal waste, vegetable material, leaf material, plant material, composting material or waste paper products. The alkane preferably includes butane, propane, methane and/or ethane, with butane being particularly preferred. Methods and apparatus are also provided for recovering plant growth-enhancing material from the treated agricultural waste and for treating soil with alkane-utilizing bacteria and/or an alkane substrate in combination with a carrier material to increase seed, bulb, plant and crop growth.

12 Claims, 13 Drawing Sheets

Non-Enhanced Plant   Butane Enhanced Plant

Enhanced Plant Growth Using Butane Biostimulation

U.S. PATENT DOCUMENTS

| | | | |
|---|---|---|---|
| 2,947,619 A | 8/1960 | Gorby | |
| 2,969,279 A | 1/1961 | Pierson | |
| 3,138,448 A | 6/1964 | Schulze | |
| 3,183,171 A | 5/1965 | Schreiner | |
| 3,184,891 A | 5/1965 | Frantzen | |
| 3,185,117 A | 5/1965 | Frantzen | |
| 3,198,620 A | 8/1965 | Larson | |
| 3,235,369 A | 2/1966 | Eweson | |
| 3,242,071 A | 3/1966 | Walker | |
| 3,361,555 A | 1/1968 | Herschler | |
| 3,372,658 A | 3/1968 | Ammann | |
| 3,474,001 A | 10/1969 | Leavitt | |
| 3,550,319 A | 12/1970 | Gaines, Jr. | |
| 3,616,216 A | 10/1971 | Wegner | |
| 3,661,549 A | 5/1972 | Freytag et al. | |
| 3,741,393 A | 6/1973 | Estes et al. | |
| 3,756,784 A | 9/1973 | Pittwood | |
| 3,794,582 A | 2/1974 | Lackme et al. | |
| 3,813,290 A | 5/1974 | Heilweil et al. | |
| 3,824,092 A | 7/1974 | Wikstrom et al. | |
| 3,846,290 A | 11/1974 | Raymond | |
| 3,969,446 A | 7/1976 | Franklin, Jr. | |
| 4,033,763 A | 7/1977 | Markels, Jr. | |
| 4,111,808 A | 9/1978 | Fair | |
| 4,119,429 A | 10/1978 | Lovness | |
| 4,249,929 A | 2/1981 | Kneer | |
| 4,321,142 A | 3/1982 | Starr | |
| 4,328,175 A | 5/1982 | Roeckel et al. | |
| 4,385,121 A | 5/1983 | Knowlton | |
| 4,454,077 A | 6/1984 | Litz | |
| 4,506,631 A * | 3/1985 | Phong-Anant | 122/2 |
| RE31,924 E | 6/1985 | Starr | |
| 4,522,723 A | 6/1985 | Kaufmann et al. | |
| 4,529,701 A | 7/1985 | Seely | |
| 4,645,603 A | 2/1987 | Frankl | |
| 4,695,378 A | 9/1987 | Ackman et al. | |
| RE32,562 E | 12/1987 | Litz | |
| 4,713,343 A | 12/1987 | Wilson, Jr. et al. | |
| 4,737,289 A | 4/1988 | Castaldi et al. | |
| 4,789,478 A | 12/1988 | Revis et al. | |
| 4,790,940 A | 12/1988 | Castaldi et al. | |
| 4,906,454 A | 3/1990 | Melanson et al. | |
| 4,956,080 A | 9/1990 | Josefik | |
| 5,006,250 A | 4/1991 | Roberts et al. | |
| 5,037,551 A * | 8/1991 | Barkley et al. | 210/603 |
| 5,038,715 A | 8/1991 | Fahs, II | |
| 5,057,221 A | 10/1991 | Bryant et al. | |
| 5,061,406 A | 10/1991 | Cheng | |
| 5,062,956 A | 11/1991 | Lupton et al. | |
| 5,073,309 A | 12/1991 | Bousquet et al. | |
| 5,082,652 A | 1/1992 | Mayfield et al. | |
| 5,085,809 A | 2/1992 | Stirling | |
| 5,147,441 A | 9/1992 | Megeed | |
| 5,169,532 A | 12/1992 | Whitlock | |
| 5,192,354 A | 3/1993 | Drysdale et al. | |
| 5,266,096 A | 11/1993 | Slavensky | |
| 5,277,815 A | 1/1994 | Beeman | |
| 5,297,495 A * | 3/1994 | Weber | 110/346 |
| 5,302,179 A | 4/1994 | Wagner | |
| 5,302,286 A | 4/1994 | Semprini et al. | |
| 5,314,076 A | 5/1994 | La Place et al. | |
| 5,316,940 A | 5/1994 | Georgiou et al. | |
| 5,326,703 A | 7/1994 | Hazen et al. | |
| 5,337,820 A | 8/1994 | Jenneman et al. | |
| 5,342,769 A | 8/1994 | Hunter et al. | |
| 5,354,688 A | 10/1994 | Francis et al. | |
| 5,384,048 A | 1/1995 | Hazen et al. | |
| 5,397,481 A | 3/1995 | Mattus | |
| 5,441,885 A | 8/1995 | Goldberg et al. | |
| 5,441,887 A | 8/1995 | Hanson et al. | |
| 5,494,576 A | 2/1996 | Hoppe et al. | |
| 5,512,479 A | 4/1996 | Steffan | |
| 5,525,239 A | 6/1996 | Duske | |
| 5,529,693 A | 6/1996 | Yano et al. | |
| 5,538,529 A | 7/1996 | Northrop | |
| 5,651,890 A * | 7/1997 | Trost | 210/603 |
| 5,660,730 A | 8/1997 | Lucchese et al. | |
| 5,678,632 A | 10/1997 | Moses et al. | |
| 5,697,186 A | 12/1997 | Neyra et al. | |
| 5,733,067 A | 3/1998 | Hunt et al. | |
| 5,733,355 A | 3/1998 | Hibino et al. | |
| 5,738,703 A | 4/1998 | Bandurski | |
| 5,755,852 A | 5/1998 | Northrop | |
| 5,755,858 A | 5/1998 | Barnett | |
| 5,789,236 A | 8/1998 | Jenneman | |
| 5,802,996 A | 9/1998 | Baxter | |
| 5,814,514 A | 9/1998 | Steffan et al. | |
| 5,820,759 A | 10/1998 | Stewart et al. | |
| 5,833,855 A | 11/1998 | Saunders | |
| 5,888,396 A | 3/1999 | Perriello | |
| 5,916,491 A | 6/1999 | Hills | |
| 5,925,290 A | 7/1999 | Hills | |
| 5,951,978 A | 9/1999 | Red'kina | |
| 6,039,874 A | 3/2000 | Teran et al. | |
| 6,051,130 A | 4/2000 | Perriello | |
| 6,105,309 A | 8/2000 | Takayanagi | |
| 6,110,372 A | 8/2000 | Perriello | |
| 6,156,203 A | 12/2000 | Anthony | |
| 6,183,644 B1 | 2/2001 | Adams et al. | |
| 6,194,193 B1 | 2/2001 | Drahos et al. | |
| 6,194,197 B1 | 2/2001 | Hyman et al. | |
| 6,200,475 B1 | 3/2001 | Chen | |
| 6,210,579 B1 | 4/2001 | Perriello | |
| 6,217,766 B1 | 4/2001 | Stetter et al. | |
| 6,244,346 B1 | 6/2001 | Perriello | |
| 6,245,235 B1 | 6/2001 | Perriello | |
| 6,303,366 B1 | 10/2001 | Steffan et al. | |
| 6,306,302 B1 | 10/2001 | Maree et al. | |
| 6,322,700 B1 | 11/2001 | Suthersan | |
| 6,361,694 B1 | 3/2002 | Trost | |
| 6,383,388 B1 | 5/2002 | Krauter et al. | |
| 6,391,209 B1 | 5/2002 | Belongia et al. | |
| 6,395,174 B1 * | 5/2002 | Teran et al. | 210/605 |
| 6,461,510 B1 | 10/2002 | Boles et al. | |
| 6,474,264 B1 | 11/2002 | Grimberg et al. | |
| 6,488,850 B2 | 12/2002 | Perriello | |
| 6,669,846 B2 | 12/2003 | Perriello | |
| 6,848,212 B2 | 2/2005 | Layzell et al. | |
| 2001/0023847 A1 | 9/2001 | Perriello | |
| 2002/0066566 A1 | 6/2002 | Perriello | |
| 2002/0195389 A1 | 12/2002 | Perriello | |
| 2003/0034301 A1 | 2/2003 | Perriello | |
| 2003/0044966 A1 | 3/2003 | Perriello | |
| 2003/0062306 A1 | 4/2003 | Perriello | |
| 2003/0066322 A1 | 4/2003 | Perriello | |
| 2003/0084609 A1 | 5/2003 | Perriello et al. | |
| 2003/0136735 A1 | 7/2003 | Perriello | |
| 2003/0167686 A1 | 9/2003 | Perriello | |
| 2003/0201227 A1 | 10/2003 | Perriello | |
| 2003/0234217 A1 | 12/2003 | Perriello | |
| 2004/0050764 A1 | 3/2004 | Perriello | |
| 2004/0124137 A1 | 7/2004 | Perriello | |

FOREIGN PATENT DOCUMENTS

| | | |
|---|---|---|
| DE | 4203830 | 8/1993 |
| DE | 19857870 | 6/2000 |
| EP | 0098138 | 1/1984 |
| JP | 07050955 | 2/1995 |
| JP | 10306003 | 11/1998 |
| WO | WO 9719036 | 5/1997 |
| WO | WO 03/037066 | 5/2003 |

WO  WO 03/053143  7/2003

OTHER PUBLICATIONS

Wilson et al., "Biotransformation of Trichloroethylene in Soil," *Applied and Environmental Microbiology*, Jan. 1985; p. 242-243, vol. 49, No. 1.

Nelson et al., "Aerobic Metabolism of Trichloroethylene by a Bacterial Isolate," *Applied and Environmental Microbiology*, Aug. 1986, p. 383-384, vol. 52.

Little et al., "Trichloroethylene Biodegradation by a Methane-Oxidizing Bacterium," *Applied and Environmental Microbiology*, Apr. 1988, p. 951-956, vol. 54.

Arciero et al. "Degradation of Trichloroethylene by the Ammonia-Oxidizing Bacterium *Nitrosomonas europaea*," *Biochemical and Biophysical Research Communications*, Mar. 15, 1989; p. 640-643, vol. 159, No. 2.

Oldenhuis et al., "Degradation of Chlorinated Aliphatic Hydrocarbons by *Methylosinus trichosporium* OB3b Expressing Soluble Methane Monooxygenase," *Applied and Environmental Microbiology*, Nov. 1989; p. 2819-2826, vol. 55, No. 11.

Tsien et al., "Biodegradation of Trichloroethylene by *Methylosinus trichosporium* OB3b," *Applied and Environmental Microbiology*, Dec. 1989; p. 3155-3161, vol. 55, No. 12.

Vannelli et al., "Degradation of Halogenated Aliphatic Compounds by the Ammonia-Oxidizing Bacterium *Nitrosomonas europaea*," *Applied and Environmental Microbiology*, Apr. 1990; p. 1169-1171, vol. 56, No. 4.

Folsom et al. "Phenol and Trichloroethylene Degradation by *Pseudomonas cepacia* G4: Kinetics and Interactions Between Substrates," *Applied and Environmental Microbiology*, May 1990; p. 1279-1285, vol. 56, No. 5.

Broholm et al., "Toxicity of 1,1,1-Trichloroethane and Trichloroethene on a Mixed Culture of Methane-Oxidizing Bacteria", *Applied and Environmental Microbiology*, Aug. 1990, p. 2488-2493, vol. 56, No. 8.

Henry et al., "Influence of Endogenous and Exogenous Electron Donors and Trichloroethylene Oxidation Toxicity on Trichloroethylene Oxidation by Methanotrophic Cultures from a Groundwater Aquifer," *Applied and Environmental Microbiology*, Jan. 1991; p. 236-244, vol. 57, No. 1.

Oldenhuis et al., "Kinetics of Chlorinated Hydrocarbon Degradation by *Methylosinus trichosporium* OB3b and Toxicity of Trichloroethylene," *Applied and Environmental Microbiology*, Jan. 1991; p. 7-14, vol. 57, No. 1.

Alvarez-Cohen et al., "Product Toxicity and Cometabolic Competitive Inhibition Modeling of Chloroform and Trichloroethylene Transformation by Methanotrophic Resting Cells," *Applied Environmental Microbiology*, Apr. 1991; p. 1031-1037, vol. 57, No. 4.

Büyüksönmez et al., "Optimization of Simultaneous Chemical and Biological Mineralization of Perchoethylene," *Applied and Environmental Microbiology*, Jun. 1999; p. 2784-2788, vol. 65, No. 6.

Maymó-Gatell et al., "Reductive Dechlorination of Chlorinated Ethenes and 1,2-Dichloroethane by '*Dehalococcoides ethenogenes*' 195," *Applied and Environmental Microbiology*, Jul. 1999; p. 3108-3113, vol. 65, No. 7.

Hamamura et al., "Diversity in Butane Monooxygenases Among Butane-Grown Bacteria," *Applied and Environmental Microbiology*, Oct. 1999; p. 4586-4593, vol. 65, No. 10.

Löffler et al., "16S rRNA Gene-Based Detection of Tetrachloroethene-Dechlorinating *Desulfuromonas* and *Dehalococcoides* Species," *Applied and Environmental Microbiology*, Apr. 2000; p. 1369-1374, vol. 66, No. 4.

Fogel et al., Biodegradation of Chlorinated Ethenes by Methane-Utilizing Mixed Culture, *Applied and Environmental Microbiology*, Apr. 1986, pp. 720-724, vol. 51, No. 4.

Wackett et al., Survey of Microbial Oxygenases: Trichloroethylene Degradation by Propane-Oxidizing Bacteria, *Applied and Environmental Microbiology*, Nov. 1989, pp. 2960-2964, vol. 55, No. 11.

Fox, Status and Trends in Bioremediation Treatment Technology, *Remediation*, Summer 1991, pp. 293-303.

Alvarez-Cohen et al., Characterization of a Methane-Utilizing Bacterium from a Bacterial Consortium That Rapidly Degrades Trichloroethylene and Chloroform, *Applied and Environmental Microbiology* Jun. 1992, pp. 1886-1893, vol. 58, No. 6.

Chang et al., Transformation Capacities of Chlorinated by Mixed Cultures Enriched on Methane, Propane, Toluene, or Phenol, *Biotechnology and Bioengineering*, Nov. 9, 1994, pp. 440-449, vol. 45.

Kim et al., Aerobic Cometabolism of Chloroform and 1,1,1-Trichloroethane by Butene-Grown Microorganisms, *Bioremediation Journal*, pp. 135-148, vol. 1, No. 2.

Hamamura et al., Chloroform Cometabolism by Butane-Grown CF8, *Pseudomonas butanovora*, and *Mycobacterium vaccae* JOB5 and Methane-Grown *Methylosinus trichosporium* OB3b, *Applied and Environmental Microbiology*, Sep. 1997, pp. 3607-3613, vol. 63, No. 9.

Steffan et al., Biodegradation of the Gasoline Oxygenates Methyl tert-Butyl Ether, Ethyl tert-Butyl Ether, and tert-Amyl Methyl Ether by Propane-Oxidizing Bacteria, *Applied and Environmental Microbiology*, Nov. 1997, pp. 4216-4222, vol. 63, No. 11.

De Bruin et al., "Complete Biological Reductive Transformation of Tetrachloroethane to Ethane", *Applied and Environmental Microbiology*, Jun. 1992, p. 1996-2000, vol. 58, No. 6. [ABSTRACT].

Mohn et al., "Reductive Dehalogenation of Chlorophenols by Desulfomonile tiedjei DCB-1", *Applied and Environmental Microbiology*, Apr. 1992, p. 1367-1370, vol. 58, No. 4. [ABSTRACT].

So et al., "Initial Reactions in Anaerobic Alkane Degradation by a Sulfate Reducer, Strain AK-01", *Applied and Environmental Microbiology*, Dec. 1999, p. 5532-5540, vol. 65, No. 12. [ABSTRACT].

Haggblom et al., "Influence of Alternative Electron Acceptors on the Anaerobic Biodegradability of Chlorinated Phenols and Benzoic Acids," *Applied and Environmental Microbiology*, Apr. 1993; p. 1162-1167, vol. 59, No. 4. [ABSTRACT].

Ramanand et al., "Reductive Dehalogenation of Chlorinated Benzenes and Toluenes Under Methanogenic Conditions," *Applied and Environmental Microbiology*, Oct. 1993; p. 3266-3272, vol. 59, No. 10. [ABSTRACT].

Coates et al., "Anaerobic Degradation of Polycyclic Aromatic Hydrocarbons and Alkanes in Petroleum-Contaminated Marine Harbor Sediments", *Applied and Environmental Microbiology*, Sep. 1997, p. 3589-3593, vol. 63, No. 9. [ABSTRACT].

So et al., "Isolation and Characterization of a Sulfate-Reducing Bacterium that Anaerobically Degrades Alkanes", *Applied and Environmental Microbiology*, Jul. 1999, p. 2969-2976, vol. 65, No. 7. [ABSTRACT].

Laue et al., "Taurine Reduction in Anaerobic Respiration of *Bilophila wadsworthia* RZATAU", *Applied and Environmental Microbiology*, May 1997, p. 2016-2021, vol. 63, No. 5. [ABSTRACT].

Wischnak et al., "*Pseudomonas* sp. Strain 273, an Aerobic $\alpha,\omega$-Dichloroalkane Degrading Bacterium", *Applied and Environmental Microbiology*, Sep. 1998, p. 3507-3511, vol. 64, No. 9. [ABSTRACT].

Ye et al., "Anaerobic Dechlorination of Polychlorobiphenyls (Aroclor 1242) by Pasteurized and Ethanol-Treated Microorganisms from Sediments", *Applied and Environmental Microbiology*, Apr. 1992, p. 1110-1114, vol. No. 4. [ABSTRACT].

Wiegel et al., "Anaerobic Dehalogenation of Hydroxylated Polychlorinated Biphenyls by *Desulfitobacterium dehalogenans*", *Applied and Environmental Microbiology*, May 1999, p. 2217-2221, vol. 65, No. 5. [ABSTRACT].

Wu et al., "Establishment of a Polychlorinated Biphenyl-Dechlorinating Microbial Consortium, Specific for Doubly Flanked Chlorines, in a Defined, Sediment-Free Medium", *Applied and Environmental Microbiology*, Jan. 2000, p. 49-53, vol. 66, No. 1. [ABSTRACT].

Miguez et al., "Monitoring Methanotrophic Bacteria in Hybrid Anaeobic-Aerobic Reactors with PCR and a Catabolic Gene Probe", *Applied and Environmental Microbiology*, Feb. 1999, p. 381-388, vol. 65, No. 2. [ABSTRACT].

Bedard et al., "Brominated Biphenyls Prime Extensive Microbial Reductive Dehalogenation of Aroclor 1260 in Housatonic River Sediment", *Applied and Environmental Microbiology*, May 1998, p. 1786-1795, vol. 64, No. 5. [ABSTRACT].

Wu et al., "Microbial Reductive Dechlorination of Aroclor 1260 in Anaerobic Slurries of Estuarine Sediments", *Applied and Environmental Microbiology*, Mar. 1998, p. 1052-1058, vol. 64, No. 3. [ABSTRACT].

Sanford et al., "Characterization of *Desulfitobacterium chlororespirans* sp. nov., Which Grows by Coupling the Oxidation of Lactate to the Reductive Dechlorination of 3-chloro-4-hydroxybenzoate", *Applied and Environmental Microbiology*, Oct. 1996, p. 3800-3808, vol. 62, No. 10. [ABSTRACT].

Nicholson et al., "Reductive Dechlorination of Chlorophenols by a Pentachlorophenol-Acclimated Methanogenic Consortium", *Applied and Environmental Microbiology*, Jul. 1992, p. 2280-2286, vol. 58, No. 7. [ABSTRACT].

Von Wintzingerode et al., "Phylogenetic Analysis of an Anaerobic, Trichlorobenzene-Transforming Microbial Consortium", *Applied and Environmental Microbiology*, Jan. 1999, p. 283-286, vol. 65, No. 1. [ABSTRACT].

Bedard et al., "Complete Reductive Dehalogenation of Brominated Biphenyls by Anaerobic Microorganisms in Sediment", *Applied and Environmental Microbiology*, Mar. 1998, p. 940-947, vol. 64, No. 3. [ABSTRACT].

Van Eekert et al., "Degradation and Fate of Carbon Tetrachloride in Unadapted Methanogenic Granular Sludge", *Applied and Environmental Microbiology*, Jul. 1998, p. 2350-2356, vol. 64, No. 7. [ABSTRACT].

Bradley et al., "Anaerobic Oxidation of [1,2-$^{14}$C]Dichloroethene Under Mn(IV)-Reducing Conditions", *Applied and Environmental Microbiology*, Apr. 1998, p. 1560-1562, vol. 64, No. 4. [ABSTRACT].

Fish et al., "Biotransformations of Aroclor 1242 in Hudson River Test Tube Microcosms", *Applied and Environmental Microbiology*, Dec. 1994, p. 4289-4296, vol. 60, No. 12. [ABSTRACT].

Locher et al., "Uptake of 4-Toluene Sulfonate by *Comamonas testosteroni* T-2", *J. Bacteriol.*, Feb. 1993, p. 1075-1080, vol. 175, No. 4. [ABSTRACT].

Sun et al., "Isolation and Characterization of *Desulfovibrio dechloracetivorans* sp. nov., a Marine Dechlorinating Bacterium Growing by Coupling the Oxidation of Acetate to the Reductive Dechlorination of 2-Chlorophenol", *Applied and Environmental Microbiology*, Jun. 2000, p. 2408-2413, vol. 66, No. 6. [ABSTRACT].

Boyle et al., "Isolation from Estaurine Sediments of a *Desulfovibrio* Strain Which Can Grow on Lactate Coupled to the Reductive Dehalogenation of 2,4,6-Tribromophenol", *Applied and Environmental Microbiology*, Mar. 1999, p. 1133-1140, vol. 65, No. 3. [ABSTRACT].

Cole et al., "Isolation and Characterization of a Novel Bacterium Growing Via Reductive Dehalogenation of 2-Chlorophenol", *Applied and Environmental Microbiology*, Oct. 1994, p. 3536-3542, vol. 60, No. 10. [ABSTRACT].

Dojka et al., "Microbial Diversity in a Hydrocarbon- and Chlorinated-Solvent-Contaminated Aquifer Undergoing Intrinsic Bioremediation", *Applied and Environmental Microbiology*, Oct. 1998, p. 3869-3877, vol. 64, No. 10. [ABSTRACT].

Hur et al., "Metabolism of Chlorofluorocarbons and Polybrominated Compounds by *Pseudomonas putida* G786(pHG-2) via an Engineered Metabolic Pathway", *Applied and Environmental Microbiology*, Nov. 1994, p. 4148-4154, vol. 60, No. 11. [ABSTRACT].

Epa, "Sequential Anaerobic/Aerobic Biodegradation of PCE at Watertown, Massachusetts", Cost and Performance Report, Mar. 2000.

Holliger et al., "A Highly Purified Enrichment Culture Couples the Reductive Dechlorination of Tetrachloroethene to Growth", *Applied and Environmental Microbiology*, Sep. 1993, p. 2991-2997, vol. 59, No. 9. [ABSTRACT].

Madsen et al., "Isolation and Characterization of an Anaerobic Chlorophenol-Transforming Bacterium", *Applied and Environmental Microbiology*, Sep. 1992, p. 2874-2878, vol. 58, No. 9. [ABSTRACT].

Mohn et al., "Limited Degradation of Chlorophenols by Anaerobic Sludge Granules", *Applied and Environmental Microbiology*, Jul. 1992, p. 2131-2136, vol. 58, No. 7. [ABSTRACT].

Baker et al., *Bioremediation*, pp. 303-304, McGraw-Hill, Inc., 1994.

www.biobutane.com/may2000.htm (downloaded on Nov. 18, 2002) dated May 1, 2000.

www.biobutane.com/march2000.htm (downloaded on Nov. 18, 2002) dated Mar. 1, 2000.

Global BioSciences, Inc. Powerpoint® brand audio visual presentation (downloaded from web on Nov. 18, 2002) (undated).

Air & Waste Management Association Show New Products information sheet (posted Jun. 25, 1999) at www.pollutionengineering.com/events/conferences/awna99/awmanp6.htm (downloaded Nov. 18, 2002).

Wilson et al., "Biological Treatment of Trichloroethylene and 1,1,1-Trichloroethane from Contaminated Air Streams", *Proceedings of Petroleum Hydrocarbons and Organic Chemicals in Ground Water: Prevention, Detection and Restoration* (The Westin Galleria, Houston, Nov. 9-11, 1988), v2, pp. 823-831, published 1989.

Todar, 2002, *Pseudomonas aeruginosa* at http://www.bact.wisc.edu/Bact330/lecturepseudomonas.

Toccalino et al., "Nitrogen Limitation and Nitrogen Fixation during Alkane Biodegradation in a Sandy Soil", *Applied and Environmental Microbiology*, Sep. 1993; pp. 2977-2983, vol. 59, No. 9.

Cary et al., "Mussel growth supported by methane as sole carbon and energy source", *Science*, 240:78-80, 1988.

Schmidt et al., "Gas hydrates and methane plumes at Hydrate Ridge", 13 pages, 2004.

Anonymous, "Lost City Expedition: Sampling Gases from the Seafloor: Rock-Microbe Linkages", undated, http://www.lostcity.washington.edu/science/instruments/shipboardsamplers/gasesfromseafloor.html.

\* cited by examiner

Enhanced Plant Growth Using Butane Biostimulation

METHODS FOR TREATING AGRICULTURAL WASTE AND PRODUCING PLANT GROWTH-ENHANCING MATERIAL

CROSS-REFERENCE TO RELATED APPLICATIONS

This application is a continuation-in-part of U.S. patent application Ser. No. 10/400,963 filed Mar. 27, 2003, which is a continuation-in-part of U.S. patent application Ser. No. 10/308,607 filed Dec. 2, 2002. The Ser. No. 10/308,607 application is a continuation-in-part of U.S. patent application Ser. No. 09/924,791 filed Aug. 8, 2001, now U.S. Pat. No. 6,669,846 which claims the benefit of U.S. Provisional Patent Application Ser. No. 60/291,165 filed May 15, 2001. The Ser. No. 10/308,607 application is also a continuation-in-part of U.S. patent application Ser. No. 09/729,039 filed Dec. 4, 2000, now U.S. Pat. No. 6,488,850 issued Dec. 3, 2002, which is a continuation-in-part of U.S. patent application Ser. No. 09/275,320 filed Mar. 24, 1999, now U.S. Pat. No. 6,245,235 issued Jun. 12, 2001, which is a continuation-in-part of U.S. patent application Ser. No. 08/767,750 filed Dec. 17, 1996, now U.S. Pat. No. 5,888,396 issued Mar. 30, 1999. The Ser. No. 09/729,039 application also claims the benefit of U.S. Provisional Patent Application Ser. No. 60/234,482 filed Sep. 22, 2000.

This application is also a continuation-in-part of U.S. patent application Ser. No. 10/282,891, Publication No. 20030084609, filed Oct. 29, 2002 and published May 8, 2003, which claims the benefit of U.S. Provisional Patent Application Ser. No. 60/334,981, filed Oct. 31, 2001.

This application is also a continuation-in-part of U.S. patent application Ser. No. 10/308,607, Publication No. 20030136735 filed Dec. 2, 2002, which is a continuation-in-part of U.S. patent application Ser. No. 09/924,791 filed Aug. 8, 2001, which claims the benefit of U.S. Provisional Patent Application Ser. No. 60/291,165 filed May 15, 2001. The Ser. No. 10/308,607 application is also a continuation-in-part of U.S. patent application Ser. No. 09/729,039 filed Dec. 4, 2000, now U.S. Pat. No. 6,488,850 issued Dec. 3, 2002, which is a continuation-in-part of U.S. patent application Ser. No. 09/275,320 filed Mar. 24, 1999, now U.S. Pat. No. 6,245,235 issued Jun. 12, 2001, which is a continuation-in-part of U.S. patent application Ser. No. 08/767,750 filed Dec. 17, 1996, now U.S. Pat. No. 5,888,396 issued Mar. 30, 1999. The Ser. No. 09/729,039 application also claims the benefit of U.S. Provisional Application Ser. No. 60/234,482 filed Sep. 22, 2000.

All of the foregoing applications and patents are incorporated herein by reference.

FIELD OF THE INVENTION

The present invention provides methods and apparatus for treating agricultural waste with an alkane substrate such as butane, propane, ethane and/or methane to stimulate bacterial digestion. The alkane treatment may also be used to reduce odor associated with the agricultural waste. The present invention also provides methods and apparatus for recovering plant growth-enhancing material from the alkane-treated agricultural waste and for treating soil with alkane-utilizing bacteria and/or an alkane substrate and a carrier to improve plant growth, e.g., increase seed germination and growth, bulb growth, crop growth, crop production, and the like.

BACKGROUND INFORMATION

Farms and other facilities produce various types of agricultural waste. For example, many farms with livestock are equipped with a slurry tank for animal manure and urine wastes. The animal waste stored in the slurry tanks may be used to enrich or fertilize crop-producing fields. The odor from these slurry tanks, which is often due to bacterial decomposition of organic matter, can be a major nuisance.

A need exists for the effective treatment of agricultural waste products, and for the reduction of odors generated from such waste products. In addition, it is desirable to enhance the growth of agricultural crops and other types of plants. The present invention has been developed in view of the foregoing.

SUMMARY OF THE INVENTION

In accordance with the present invention, methods and apparatus are provided for treating agricultural waste with an alkane substrate to stimulate bacterial digestion. The alkane treatment may also reduce odors generated by agricultural waste. In a preferred embodiment, the alkane substrate comprises butane, however, other alkanes such as propane, ethane and methane may also be used. The present invention also provides methods and apparatus for recovering plant growth-enhancing material from the treated agricultural waste and applying the growth-enhancing material to soil, e.g., to increase seed, bulb, plant, and crop growth. The agricultural waste may include animal waste, vegetable material, leaf material, plant material, composting material, or waste paper products.

An aspect of the present invention is to provide a method for treating agricultural waste. The method includes introducing an alkane substrate to the waste to stimulate the growth of alkane-utilizing bacteria which at least partially digest the agricultural waste.

Another aspect of the present invention is to provide an apparatus for treating agricultural waste. The apparatus includes a waste containment vessel, a source of alkane substrate, and an alkane injector line in flow communication with the waste containment vessel and source of alkane substrate.

A further aspect of the present invention is to provide an apparatus for treating agricultural waste including means for introducing an alkane substrate into the agricultural waste to at least partially digest the agricultural waste.

Another aspect of the present invention is to provide a method for producing plant growth-enhancing material. The method includes introducing an alkane substrate to agricultural waste to stimulate the growth of alkane-utilizing bacteria which at least partially digest the waste, and recovering plant growth-enhancing material comprising at least partially digested agricultural waste.

Another aspect of the present invention is to provide a plant growth-enhancing material comprising alkane-utilizing bacteria and a carrier material such as partially digested agricultural waste or water.

A further aspect of the present invention is to provide a plant growth-enhancing material comprising an alkane substrate and a carrier material such as partially digested agricultural waste or water.

Another aspect of the present invention is to provide a method for treating soil to enhance plant growth by applying alkane-utilizing bacteria and a carrier material such as agricultural waste and/or water to the soil.

A further aspect of the present invention is to provide a method for treating soil to enhance plant growth by applying an alkane substrate and a carrier material such as agricultural waste and/or water to the soil.

Another aspect of the present invention is to provide a method of enhancing plant growth, the method comprising introducing alkane-utilizing bacteria into a location adjacent to a plant.

Another aspect of the present invention is to provide a method of enhancing plant growth, the method comprising introducing an alkane substrate and a carrier material into a location adjacent to a plant.

These and other aspects of the present invention will be more apparent from the following description.

DETAILED DESCRIPTION

Figure 1:
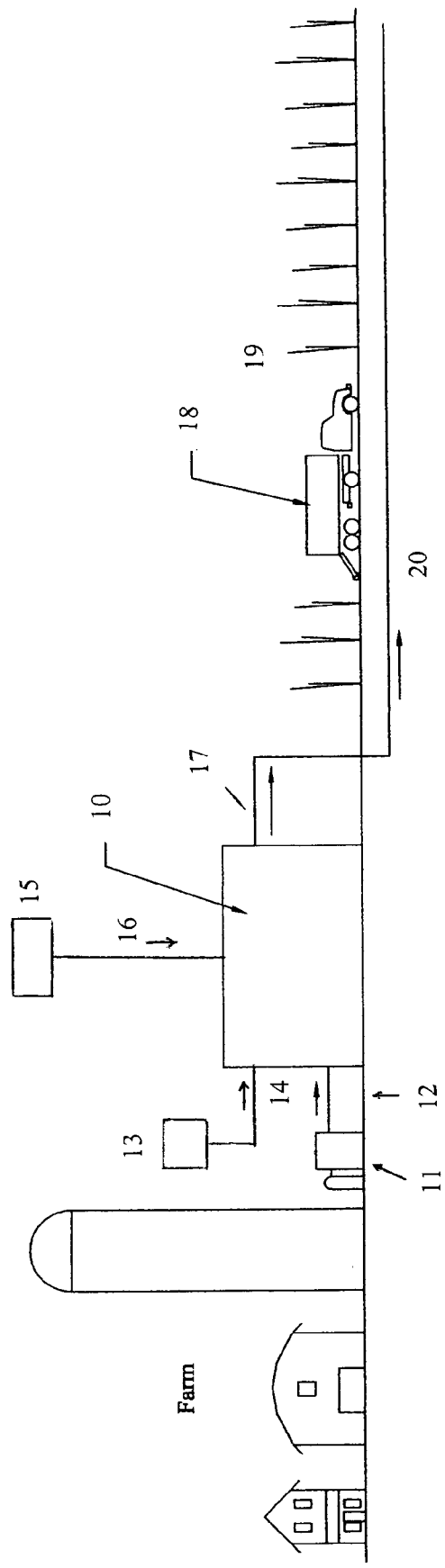
FIG. 1 is a schematic diagram depicting a process for alkane treatment and beneficial reuse of agricultural waste.

In accordance with the present invention, an alkane substrate is introduced into agricultural waste to treat the waste by stimulating bacterial digestion. The alkane substrate may also reduce odors generated from the agricultural waste. Plant growth-enhancing material may be recovered from the treated agricultural waste and applied to soil to increase plant growth, e.g., seed, bulb, plant, and crop growth. The agricultural waste may include, among other things, animal waste such as manure and urine, vegetable material, leaf material, plant material, composting material, or waste paper products. For example, the animal waste may comprise animal manure and/or urine, such as cow manure, cattle manure, horse manure, sheep manure, pig manure, goat manure, and urine from such animals, as well as chicken and turkey waste. Vegetable, leaf, and plant material may include any substance that contains the organic part of a vegetable, leaf, or plant. Composting material may originate from any sources, whether agricultural, industrial, or domestic. Waste paper product may include any packaging, cardboard, waste paper, or cellulose-based product.

The alkane may include butane, propane, methane, and/or ethane, with butane being preferred. As used herein, the term "alkane substrate" includes any solid, liquid, or gas in which an alkane is present in sufficient amounts to stimulate the growth of alkane-utilizing bacteria or treat odors of agricultural waste.

In accordance with an embodiment of the present invention, the introduction of an alkane substrate to agricultural waste increases the activity of alkane-utilizing bacteria in the waste, which in turn may destroy odors through enzymatic reactions. Because odor-reducing bacteria may coexist within populations of odor-causing bacteria, the alkane substrate may stimulate the production of bacterial enzymes that degrade daughter or breakdown compounds responsible for odors. In addition, the alkane itself may directly serve as a deodorizer. Butane, for example, is a large non-planar four carbon molecule. While not intending to be bound by any particular theory, the butane molecular structure, reactive surface area, and size may play a key role in causing butane to destroy and/or remove odors from solid, liquid, and gaseous/air environments. In an aqueous or non-aqueous environment, butane in gaseous or liquid form may remove odors by chemically reacting, counteracting, absorbing, adsorpting, neutralizing and/or dissolving odors and toxic gases, which are unpleasant to humans and animals. For example, butane may act as a gaseous carbon scrubber for many odors.

In accordance with another embodiment of the present invention, plant growth-enhancing material is recovered from agricultural waste that has been treated with an alkane substrate. When an alkane substrate (and optionally air or water) is introduced into organic waste, it may stimulate the growth of alkane-utilizing bacteria resulting in an increase in the bacterial population. The addition of such beneficial microorganisms to a soil mix, growing bed, or crop may enhance plant growth, e.g., help prevent disease, and increase nutrient uptake, growth and development, and tolerance to stresses such as cold, heat and drought. Thus, the treated agricultural waste itself becomes a material that can be used as a plant growth-enhancing additive for seeds, bulbs, plants and crops.

In accordance with a further embodiment, an alkane substrate and/or alkane-utilizing bacteria, may be applied to soil along with a carrier material, such as agricultural waste or water, to enhance plant growth. In a particular embodiment, alkane-treated agricultural waste is applied to soil that is located within a crop-producing field. Alkanes provide a food source for naturally occurring bacteria in the soil, thereby stimulating microbial activity and growth.

Plant roots provide suitable habitats for the growth of microorganisms, and particularly high numbers of diverse microbial populations are found on and surrounding plant roots in the rhizosphere (i.e., the root zone). Interactions between soil microorganisms and plant roots satisfy important nutritional requirements for both the plant and the associated microorganisms. Microbial populations in the rhizosphere may benefit the plant in a variety of ways, including increased recycling and solubilization of mineral nutrients; synthesis of vitamins, amino acids, auxins and gibberellins, which stimulate plant growth; and antagonism with potential plant pathogens through competition and development of amensal relationships (detrimental to one while not adversely affecting the other) based on the production of antibiotics.

Soil organic matter (SOM) is an accumulation of dead plant matter, partially decayed and partially resynthesized plant and animal residues, and live microbial and root matter. The SOM contributes to plant growth through its effects on the chemical, biological and physical properties of soil. SOM supplies nitrogen, phosphorus and sulfur for plant growth, serves as an energy source for soil microfloral and macrofaunal organisms, and promotes good soil structure. SOM content is directly related to the sorption of most herbicides and many organic compounds. Organic chemicals associate with the organic fraction of soils. Thus, SOM content strongly influences pesticide behavior in soil, including effectiveness against target species, phytotoxity to subsequent crops, leachability, volatility and biodegradability. Applying alkane-treated agricultural waste to the soil may increase SOM.

Humus is the organic portion of the soil remaining after microbial decomposition. Humus is a complex and rather microbially resistant mixture of brown to black, amorphous and colloidal substances modified from the original plant tissues or resynthesized by soil microorganisms. Humus affects soil structure. Aeration, water holding capacity and permeability are all favorably affected by humus. The application of alkane-treated agricultural waste will lead to an increase in soil microorganisms, which will lead to an increase in soil humus content.

Enhanced plant growth in accordance with the present invention may be achieved by several different routes. Increases in alkane-utilizing bacteria may result in an increase in enzymes, nutrients and biochemical reactions/interactions with SOM and humus that lead to the formation of additional compounds that are beneficial to plants. Addition of alkane-treated agricultural waste may also lead to improvement in soil properties such as soil structure, aeration, water holding capacity and permeability, as well as the improved performance of herbicides, fungicides, pesticides and other agricultural chemicals.

The increases in soil bacteria and cell respiration due to the alkane-treated waste may lead to increased amounts of carbon dioxide available to plants, which is used directly by plants during photosynthesis. Furthermore, alkanes in the root zone may also provide a direct benefit as a nutrient to plants.

Increased root growth due to the alkane-treated waste may enable plants to reach groundwater at greater depths and thus enable them to thrive under more harsh conditions, and in areas/climates where plants have not previously been able to thrive, or in less than optimal soil conditions.

Increased plant growth/plant size due to the alkane-treated waste may also lead to increased quantities of fruit, flowers, vegetables, legumes or grains produced by individual plants, or to increased size of individual fruit, flowers, ornamental flowers, vegetables, legumes or grains produced by plants.

Increased rate of seed germination due to the alkane-treated waste may lead to increased numbers of plants produced by an individual seeding/planting event.

Increased plant ability to resist pests, diseases, lethal bacteria and fungi due to the alkane-treated waste may lead to an increased survival rate of plants that will result in increased production of plants, fruit, flowers, vegetables, legumes or grains during a growing season. Furthermore, increased plant ability to endure stress due to the alkane-treated waste, such as cold, heat or drought, may lead to a longer growing season. Increased plant size or number of plants due to the alkane-treated waste may also lead to increased production of oxygen in the atmosphere resulting from the process of photosynthesis.

Increased rate of plant growth due to the alkane-treated waste may lead to an increased number of possible cycles of individual seedings/planting events followed by growth period and harvesting events within an individual growing season, with the possibility of producing the outcome of two growing seasons in one.

In accordance with the present invention, the alkane-treated waste may be applied as a solid, liquid, or slurry. It may be applied alone, simultaneously or intermittently with other nutrients or chemicals.

The alkane-treated waste may be used on all soil types, including soil-less mixtures used for growing plants. It may be applied to plants grown outdoors or in greenhouses, to hydroponic and aeroponic growing systems, which use no soil, to aquatic growing systems, such as seaweed or kelp beds, or to semi-aquatic growing systems or fields, such as puddled rice fields or paddies.

The present method may be applied to all plants, grasses, trees, shrubs, vines, fruit, flowers, legumes, grains and mosses in the Kingdom Plantae, for example, flowering monocot and dicot plants (phyla Angiospermophyta, class Monocotyledoneae, class Dicotylodoneae,); conifers (phyla Ginkgophyta, Gnetophyta, Cycadophyta and Coniferophyta); non vascular plants including mosses (phylum Bryophyta), liverworts (phylum Hepatophyta), hornworts (phylum Anthoceraphyta); and ferns (phyla Filicinophyta, Sphenophyta, Lycodophyta and Psilophyta).

Many farms with livestock are required to construct a slurry tank for animal manure and urine wastes. The odor wafting from these slurry tanks, which is often due to bacterial decomposition of organic matter, can be a nuisance for neighboring residences. In a preferred embodiment, butane may be injected into a slurry tank to control and abate malodors emanating from the animal waste. The butane may be mixed with an oxygen-containing gas, e.g., air, oxygen blended with inert gases such as helium, argon, nitrogen, carbon monoxide, and the like, or pure oxygen, to further stimulate the activity of butane-utilizing bacteria.

In addition, farms with livestock and slurry tanks are mandated by federal law to enrich or fertilize crop-producing fields with animal waste stored in the slurry tanks. In another preferred embodiment, butanated water may be injected into a slurry tank to increase the population of butane-utilizing bacteria in the wastestream, which may then be added to crop-producing fields to comply with federal regulations. The butane-utilizing bacteria contained in the slurry tank mixture will essentially inoculate and pretreat the fields, germinating seeds and/or the rhizosphere, and thereby increasing agricultural yields and enhancing plant growth and other plant attributes.

FIG. 1 depicts a process and apparatus for alkane treatment and beneficial reuse of agricultural waste. A waste containment vessel 10, such as a slurry tank, stores agricultural waste, e.g., animal manure and urine. An alkane storage tank 11, which stores a source of alkane substrate in either gaseous or liquid form, supplies the alkane substrate to the waste containment vessel 10 through alkane injector line 12 to stimulate microbial digestion of the agricultural waste. The alkane substrate also reduces odors from the agricultural waste. An optional source of oxygen-containing gas 13, e.g., air, may be fed to the waste containment vessel 10 through an air injector line 14 if aerobic treatment is desired. An optional source of water 15 may also be fed to the waste containment vessel 10 through water injector line 16 to moisten the waste or make the waste into a slurry. Treated waste is transported from the waste containment vessel 10 through an outlet line 17. The treated waste may be delivered for aboveground distribution 18 to a crop-producing field 19. Alternatively, the treated waste may be delivered to the field 19 using an underground injection distribution network 20. Alternatively, the injection distribution network 20 may be located on or above the ground. The injection distribution network 20 may deliver the waste to the field either continuously or intermittently. For example, injections may occur hourly, daily, monthly, etc. in order to optimize plant growth.

Some alkane-utilizing bacteria in accordance with the biostimulation methods of the present invention may include the following Groups (in addition to fungi, algae, protozoa, rotifers and other aerobic and anaerobic microbial populations found in decaying materials):

| Group | Description |
| --- | --- |
| Group 1: | The Spirochetes |
| Group 2: | Aerobic/Microaerophilic, motile, helical/vibroid, gram-negative bacteria |
| Group 3: | Nonmotile (or rarely motile), gram-negative bacteria |
| Group 4: | Gram-negative aerobic/microaerophilic rods and cocci |
| Group 5: | Facultatively anaerobic gram-negative rods |
| Group 6: | Gram-negative, anaerobic, straight, curved, and helical bacteria |
| Group 7: | Dissimilatory sulfate- or sulfur-reducing bacteria |
| Group 8: | Anaerobic gram-negative cocci |
| Group 10: | Anoxygenic phototrophic bacteria |
| Group 11: | Oxygenic phototrophic bacteria |
| Group 12: | Aerobic chemolithotrophic bacteria and associated organisms |
| Group 13: | Budding and/or appendaged bacteria |
| Group 14: | Sheathed bacteria |
| Group 15: | Nonphotosynthetic, nonfruiting gliding bacteria |
| Group 16: | The fruiting, gliding bacteria and the Myxobacteria |
| Group 17: | Gram-positive cocci |
| Group 18: | Endospore-forming gram-positive rods and cocci |
| Group 19: | Regular, nonsporing, gram-positive rods |
| Group 20: | Irregular, nonsporing, gram-positive rods |
| Group 21: | The mycobacteria |
| Groups 22–29: | The actinomycetes |
| Group 22: | Nocardioform actinomycetes |
| Group 23: | Genera with multiocular sporangia |
| Group 24: | Actinoplanetes |
| Group 25: | Streptomycetes and related genera |
| Group 26: | Maduromycetes |
| Group 27: | Thermomonospora and related genera |
| Group 28: | Thermoactinomycetes |
| Group 29: | Genus *Glycomyces*, Genus *Kitasatospira* and Genus *Saccharothrix* |
| Group 30: | The Mycoplasmas - cell wall-less bacteria |
| Group 31: | The Methanogens |
| Group 32: | Archaeal sulfate reducers |
| Group 33: | Extremely halophilic, archaeabacteria (halobacteria) |
| Group 34: | Cell wall-less archaeabacteria |
| Group 35: | Extremely thermophilic and hyperthermophilic $S^0$-metabolizers |

In addition to the above-listed bacteria examples, facultative anaerobes and microaerophilics, which are bacteria capable of surviving at low levels of oxygen, may also be used in accordance with the present invention. They do not require strict anaerobic conditions such as the obligate anaerobes. Examples include acidophilic, alkaliphilic, anaerobe, anoxygenic, autotrophic, chemolithotrophic, chemoorganotroph, chemotroph, halophilic, methanogenic, neutrophilic, phototroph, saprophytic, thermoacidophilic and thermophilic bacteria. Algae and fungi may also be included as alkane-utilizing bacteria in accordance with the present invention.

The following examples illustrate various aspects of the prevent invention, but are not intended to limit the scope of the invention.

EXAMPLE 1

Gladioli Bulb Experiment

Figure 2:
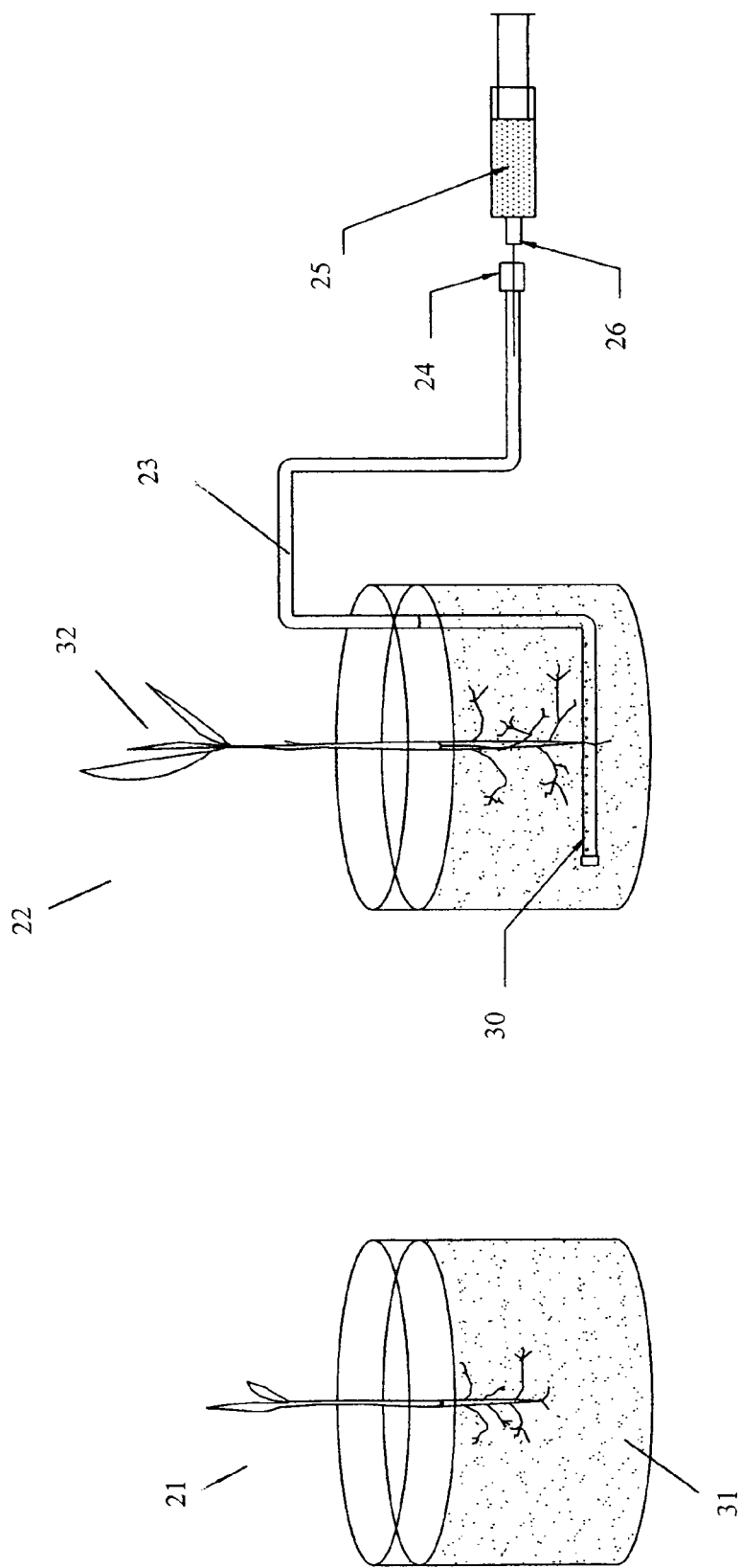
FIG. 2 is a schematic diagram depicting experimental vessels for enhanced plant growth using butane biostimulation.

Four Nalgene plastic vessels (two for butane enhanced growth and two for controls), each approximately 11 cm. in diameter and 12 cm. deep, were prepared with three 0.4 cm drainage holes drilled in each base. FIG. 2 depicts one control vessel 21 and one butane enhanced growth vessel 22. Each butane enhanced growth vessel 22 was prepared with a 12 cm section of Teflon tubing 23 and connected at one end to a syringe port 24 equipped with Teflon-coated septum for injections of butane 25 using a syringe 26. Nine butane injection holes 30 were placed at 1 cm intervals along the tubing 23 inside the vessel 22. Each vessel was filled with approximately 800 $cm^3$ of Pro-Mix™ Potting Soil 31.

Figure 3:
FIG. 3 is a photograph showing experimental vessels for enhanced plant growth using butane biostimulation and Gladioli bulbs.

Each vessel contained one Gladioli bulb 32 placed at a depth of 10 cm below soil surface. FIG. 3 is a photograph showing the bulbs and vessels. Each vessel was then watered with 100 ml spring water and positioned on its own drainage tray on a self approximately 60 cm below two 33 watt grow light tubes (no sunlight) equipped with a timer set for 16 hours light on, 6 hours light off.

Ambient temperature was recorded, water was sprinkled evenly over the soil surface of each vessel, and n-butane was injected into the root zone (rhizosphere) through the syringe port of the butane enhanced growth vessel according to the regimen shown in Table 1.

TABLE 1

Butane Injection Schedule - Gladioli Bulb Experiment

| Day No. | Time | Volume of Butane | Water Added | Ambient Temperature |
| --- | --- | --- | --- | --- |
| 1 | 19:28 | 100 ml | 100 ml | 20° C. |
| 2 | 19:22 | 100 ml | 100 ml | 20° C. |
| 3 | 19:25 | 100 ml | none | 16.5° C. |
| 4 | 13:39 | 100 ml | none | 18.5° C. |
| 5 | — | — | — | — |
| 6 | 19:30 | 100 ml | none | 18.5° C. |
| 7 | 18:30 | 100 ml | none | 19.0° C. |
| 8 | — | — | — | — |
| 9 | 19:00 | 100 ml | 50 ml | 20.0° C. |
| 10 | 18:30 | 100 ml | None | 20.0° C. |
| 12 | 19:30 | 200 ml | None | 20.0° C. |
| 14 | 16:30 | 100 ml | 50 ml | 20.0° C. |
| 15* | 20:00 | 100 ml | none | 19.0° C. |
| 16 | 15:00 | 120 ml | 100 ml | 20.5° C. |
| 18 | 11:30 | 120 ml | None | 19.5° C. |
| 19 | The experiment was halted. Liquid butane injected into the rhizosphere killed the growing plants. | | | |

— not recorded
*first sign of growth above the soil surface

EXAMPLE 2

Gladioli Bulb Experiment

Since the Gladioli plants were killed by liquid butane injection, a new growth experiment was initiated. Once again, four Nalgene plastic vessels (two for butane enhanced growth and two for controls), each approximately 11 cm. in diameter and 12 cm. deep, were prepared with three 0.4 cm drainage holes drilled in each base. Each butane enhanced growth vessel was prepared with a 12 cm section of Teflon tubing as and connected at one end to a syringe port equipped with Teflon-coated septum for butane injections through a syringe. Nine butane injection holes were placed at 1 cm intervals along the tubing inside the vessel. Each vessel was filled with approximately 800 cm$^3$ of Pro-Mix™ Potting Soil (see FIG. 2 and FIG. 3).

Each vessel contained one Gladioli bulb placed at a depth of 10 cm below soil surface. Each vessel was then watered with 100 ml spring water and positioned on its own drainage tray on a shelf approximately 60 cm below two 33 watt grow light tubes (no sunlight) equipped with a timer set for 16 hours light on, 6 hours light off.

Ambient temperature was recorded, water was sprinkled evenly over the soil surface of each vessel, and n-butane was injected into the root zone (rhizosphere) through the syringe port of the butane enhanced growth vessel according to the regimen shown in Table 2.

TABLE 2

Butane Injection Schedule - Gladioli Bulb Experiment

| Day No. | Time | Volume of Butane | Water Added | Ambient Temperature |
|---|---|---|---|---|
| 1 | 17:30 | 60 ml | 100 ml | 20° C. |
| 2 | 15:00 | 60 ml | 100 ml | 20° C. |
| 3 | 15:20 | 60 ml | 100 ml | 20.0° C. |
| 4 | 11:20 | 60 ml | 100 ml | 19.0° C. |
| 6 | 14:00 | 60 ml | 100 ml | 21.0° C. |
| 7 | 17:15 | 60 ml | none | 21.0° C. |
| 8 | 13:15 | 60 ml | none | 21.0° C. |
| 9 | 15:15 | 145 ml | 50 ml | 21.0° C. |
| 10 | 19:00 | 145 ml | none | 21.0° C. |
| 13 | 10:45 | 150 ml | none | 19.0° C. |
| 14* | 20:00 | 150 ml | none | 20.0° C. |
| 15 | 13:45 | 150 ml | 100 ml | 22.0° C. |
| 16 | 20:45 | 150 ml | none | 20.0° C. |
| 17 | 19:05 | 180 ml | 50 ml | 20.0° C. |
| 18 | 15:30 | 150 ml | none | 23.0° C. |
| 19 | 13:59 | 120 ml | none | 23.0° C. |
| 20 | | | | |
| 21 | Experiment halted and bulbs unearthed. | | | |

*first sign of growth above the soil surface

Figure 4:
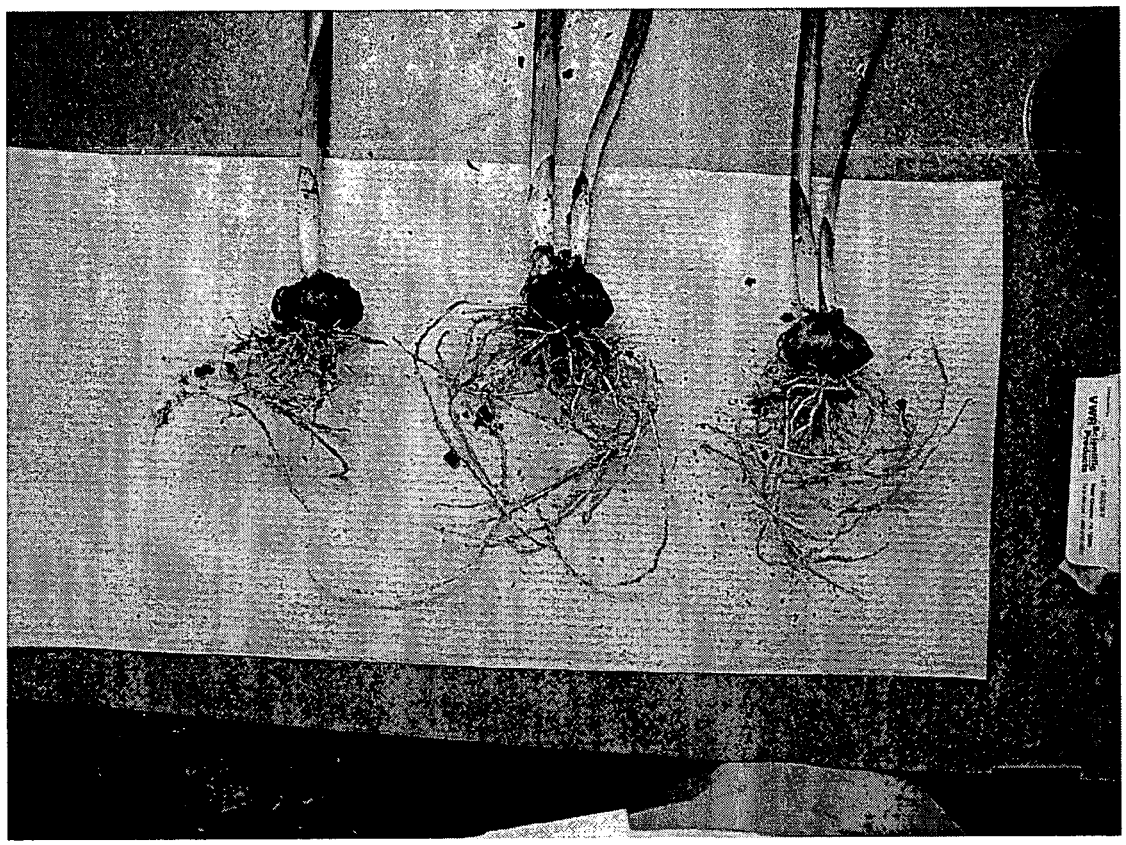
FIG. 4 is a photograph of a control Gladioli bulb and butane enhanced Gladioli bulbs.

On Day No. 18, all four plants (two butane enhanced growth and two control) were unearthed to the extent possible without damaging the root system to reveal the root bulb (FIG. 4).

Two of the plants shown in FIG. 3 (the two on the right) had undergone butane enrichment for a period of 17 days. The left plant was the control. The second control (not shown) was nearly identical to the one shown. The root development in the two butane enrichment bulbs was greater than the root development in the control plant. All three plants were Gladioli and the bulbs used for the experiment were of very similar size and growth development prior to beginning the experiment. Of special note is the bifurcation noted in the butane enhanced bulbs. This is extremely unusual for bulb growth and development. In most normal growth circumstances, the primary shoot extends above the soil line before bifurcating and the secondary shoot extends off of the primary shoot. They do not extend directly from the bulb sphere. By injecting with butane gas, the bulbs were apparently conditioned to grow two plants. All of the butane enhanced shoots grew directly from the bulb sphere.

As shown in Table 3, the butane-enhanced bulbs each grew to a maximum of 27.0 cm and 29.0 cm in height for the primary shoots and 14.0 and 23.0 cm for the secondary shoots. The control plants reached heights of 22.0 cm and 28.0 cm on the final day of growth. However, it should be noted that the butane enhanced bulbs supported the growth of two plants as opposed to one.

TABLE 3

Seedling Height

| Day No. | Butane Bulb 1 | Butane Bulb 2 | Control Bulb 2 | Control Bulb 2 |
|---|---|---|---|---|
| 1 | 5.0 cm | Main shoot 7.0 cm Secondary shoot 3.0 cm | 3.0 cm | 5.0 cm |
| 2 | Main shoot 7.5 cm Secondary shoot 0.5 cm | Main shoot 10.0 cm Secondary shoot 5.5 cm | 4.6 cm | 7.0 cm |
| 3 | Main shoot 14.0 cm Secondary shoot 3.5 cm | Main shoot 15.5 cm Secondary shoot 10.5 cm | 9.5 cm | 11.0 cm |
| 4 | Main shoot 18.5 cm Secondary shoot 6.0 cm | Main shoot 19.5 cm Secondary shoot 14.0 cm | 13.0 cm | 16.0 cm |
| 5 | Main shoot 23.0 cm Secondary shoot 10.0 cm | Main shoot 24.0 cm Secondary shoot 18.0 cm | 17.0 cm | 21.5 cm |
| 6 | Main shoot 27.0 cm Secondary shoot 14.0 cm | Main shoot 29.0 cm Secondary shoot 23.0 cm | 22.0 | 28.0 |

EXAMPLE 3

Method of Butane Enhanced Sunflower Plant Growth in Sand

Figure 5:
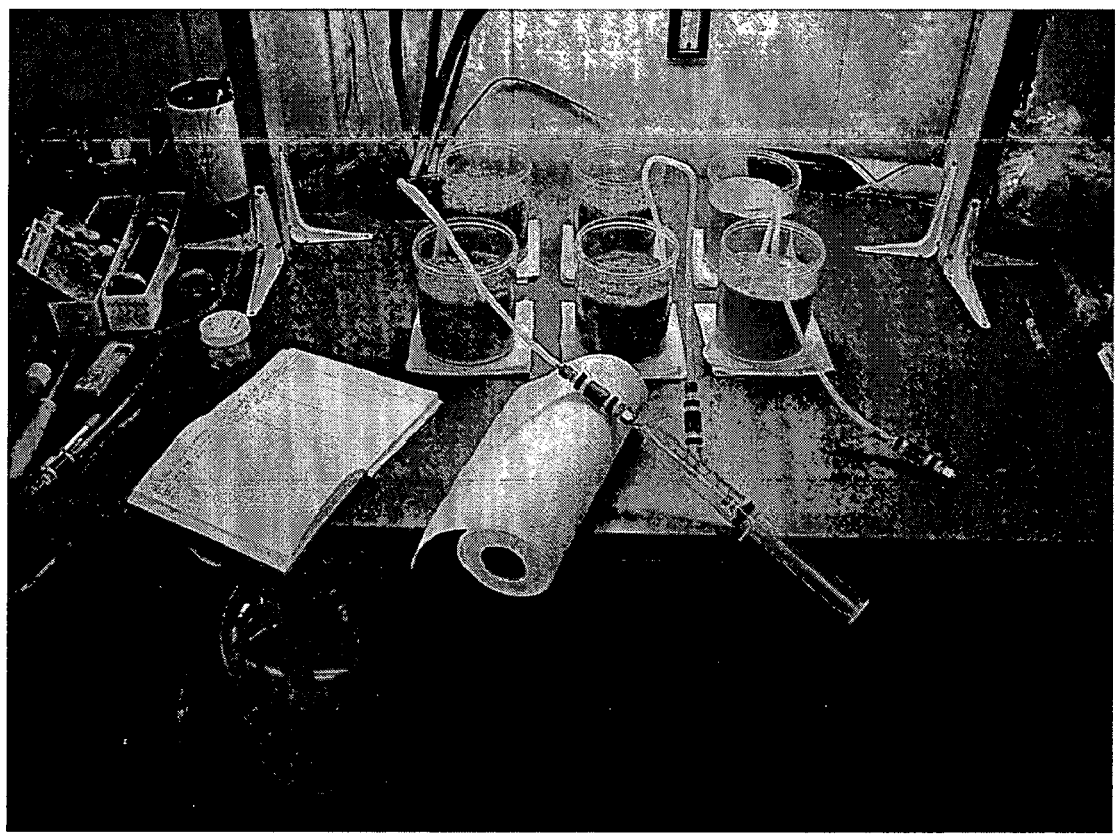
FIG. 5 is a photograph showing experimental vessels for butane enhanced sunflower plant growth in sand.

An experiment was conducted to determine if butane enrichment could support luxurious plant growth in sand where very little organic material is available. Six Nalgene plastic vessels (three for butane enhanced growth and three for controls), each approximately 11 cm. in diameter and 12 cm. deep, were prepared with three 0.4 cm drainage holes drilled in each base. Each butane enhanced growth vessel was prepared with a 12 cm section of Teflon tubing as shown in FIG. 5 and connected at one end to a syringe port equipped with Teflon-coated septum for butane injections. Nine butane injection holes were placed at 1 cm intervals along the tubing inside the vessel. Four vessels were filled with approximately 800 cm$^3$ of Paver Construction Sand (non-sterile) and two vessels contained sterilized Caribbean beach sand (see FIG. 5).

Each vessel contained one sunflower (Sun Gold—Golden Yellow Double) seed placed at a depth of 5.0 cm below soil surface. Each vessel was then watered with 100 ml spring water and positioned on its own drainage tray on a shelf approximately 60 cm below two 33 watt grow light tubes (no sunlight) equipped with a timer set for 16 hours light on, 6 hours light off.

Ambient temperature was recorded, water was sprinkled evenly over the soil surface of each vessel, and n-butane was injected into the root zone (rhizosphere) through the syringe port of the butane enhanced growth vessel according to the regimen shown in Table 4.

TABLE 4

Butane Injection Schedule

| Day No. | Time | Volume of Butane | Water Added | Ambient Temperature |
|---|---|---|---|---|
| 1 | 16:00 | 240 ml | 200 ml | 21.0° C. |
| 2 | 16:00 | 180 ml | 100 ml | 20.0° C. |
| 6 | 13:00 | 240 ml | 30 ml | 20.0° C. |

TABLE 4-continued

Butane Injection Schedule

| Day No. | Time | Volume of Butane | Water Added | Ambient Temperature |
|---|---|---|---|---|
| 7 | 15:30 | 200 ml | none | 20.0° C. |
| 8 | 14:00 | 200 ml | 30 ml | 20.0° C. |
| 9 | 16:30 | 200 ml | 10 ml | 20.0° C. |
| 10 | 13:30 | 200 ml | None | 20.0° C. |
| 11 | 06:00 | 200 ml | 25 ml | 20.0° C. |
| 13 | 19:00 | 200 ml | 10 ml | 20.0° C. |
| 14 | 14:00 | 200 ml | 25 ml | 20.0° C. |
| 15 | 15:00 | 200 ml | none | 22.0° C. |
| 16 | 15:30 | 200 ml | None | 22.0° C. |
| 17 | 13:00 | 200 ml | none | 22.0° C. |
| 20 | 14:00 | 200 ml | 20 ml | 22.0° C. |
| 21 | 15:00 | 200 ml | none | 22.0° C. |
| 22 | 13:30 | 200 ml | none | 22.0° C. |
| 23 | | Experiment Ended. | | |

Final seed growth was observed after 23 days. Final growth measurements for all seeds are recorded in Table 5.

TABLE 5

Seedling Height

| Day No. | Butane Enhanced Paver Sand | Butane Enhanced Caribbean Beach Sand | Control Paver Sand | Control Caribbean Beach Sand |
|---|---|---|---|---|
| 23 | 20 cm, 6.0 cm | no seed growth or germination | 17.0 cm, 5.5 cm | no seed growth or germination |

Figure 6:
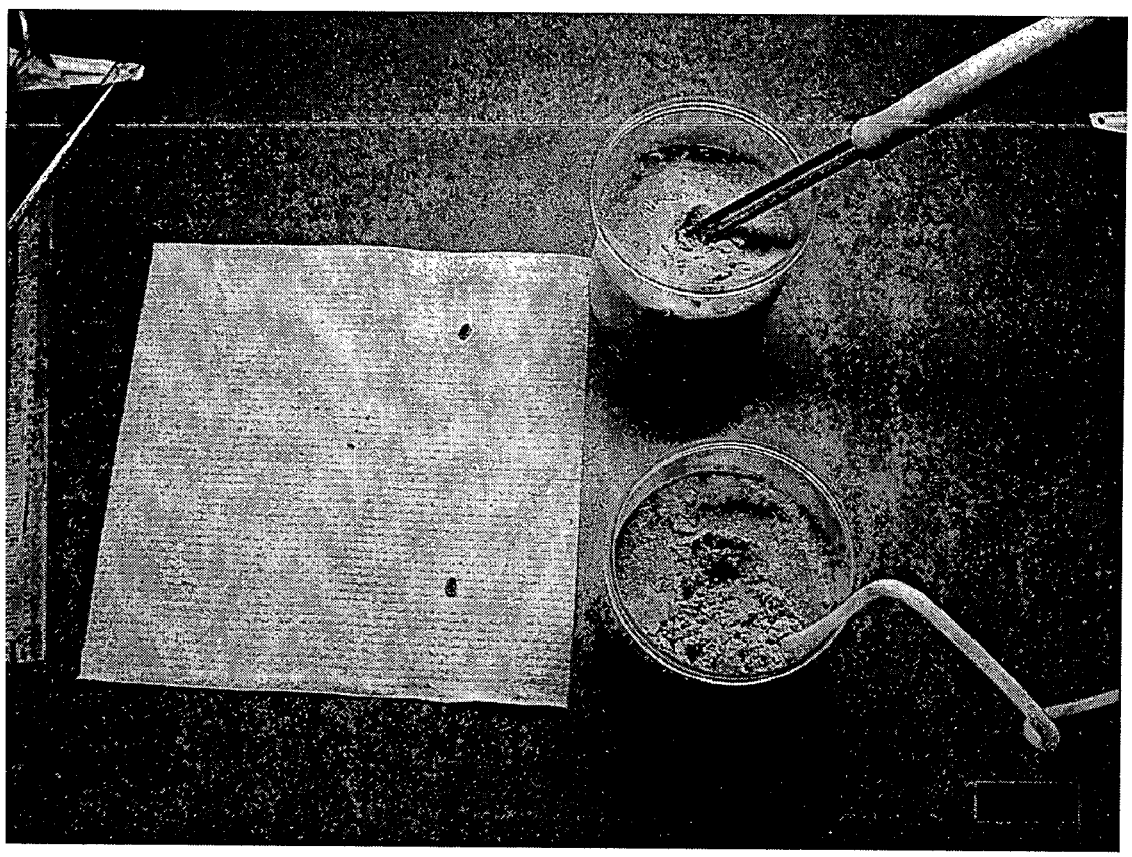
FIG. 6 is a photograph of a control seed and a butane enhanced seed for butane enhanced sunflower plant growth in sand.
Figure 7:
FIG. 7 is a photograph of seed germination for butane enhanced sunflower plant growth in sand.

On Day No. 23, all growth vessels were unearthed. All seeds germinated in the Paver Sand. No seed growth or germination was observed in the sterilized beach sand (see FIGS. 6 and 7). This demonstrates the importance of having a healthy and established microbial population present in the soil near the root zone, rhizosphere or germinating seed that will utilize butane as a food source and express the requisite enzymes that enhance plant growth and other plant attributes.

Figure 8:
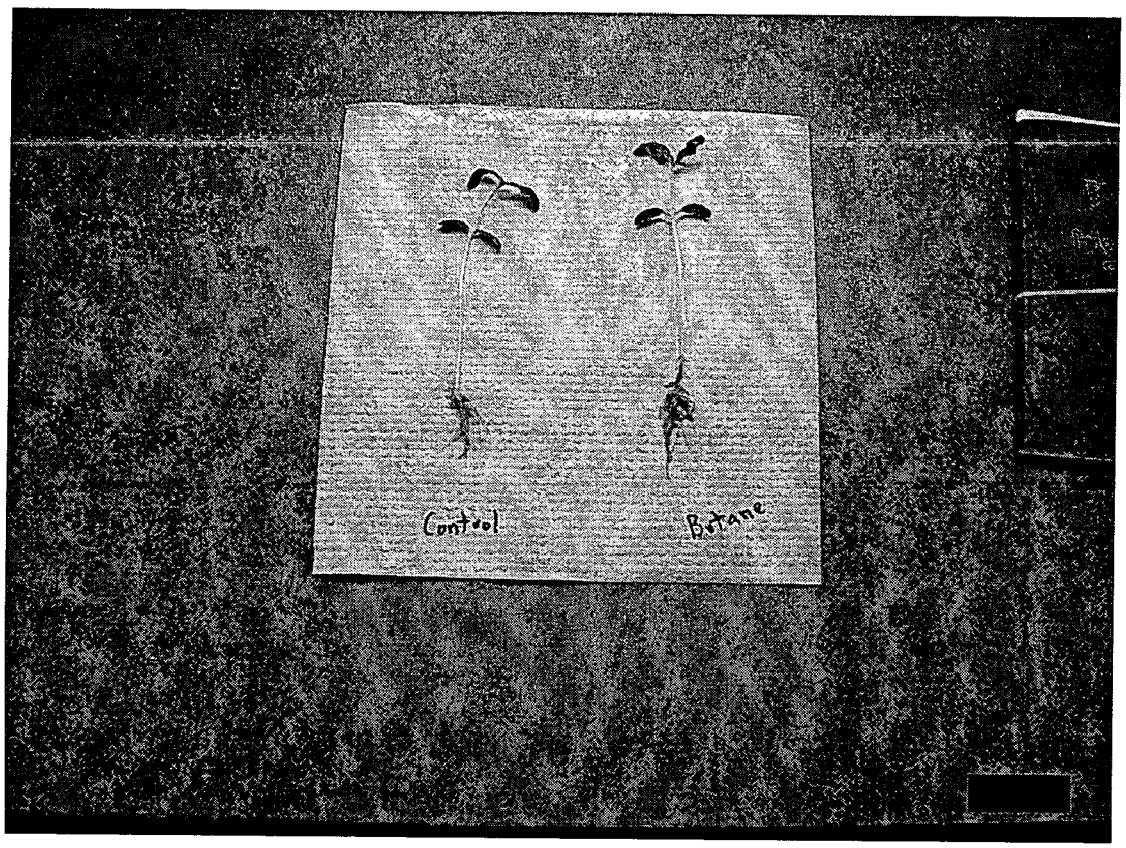
FIG. 8 is a photograph of the roots of a control plant and a butane enhanced plant for butane enhanced sunflower plant growth in sand.

After the plants were unearthed and soil was removed to the extent possible without damaging the roots, the main (longest) roots of one control plant and butane enhanced plant were compared (FIG. 8). The final growth for the control plant was 17.0 cm. The final growth for the butane enhanced plant growth was 20.0 cm. Of particular note was the root development in the butane enhanced plant. The root development was thicker and more robust.

EXAMPLE 4

Method of Butane Enhanced Corn Growth in Sand Using Butanated Water

Figure 9:
FIG. 9 is a photograph showing experimental vessels for butane enhanced corn growth in sand using butanated water.
Figure 10:
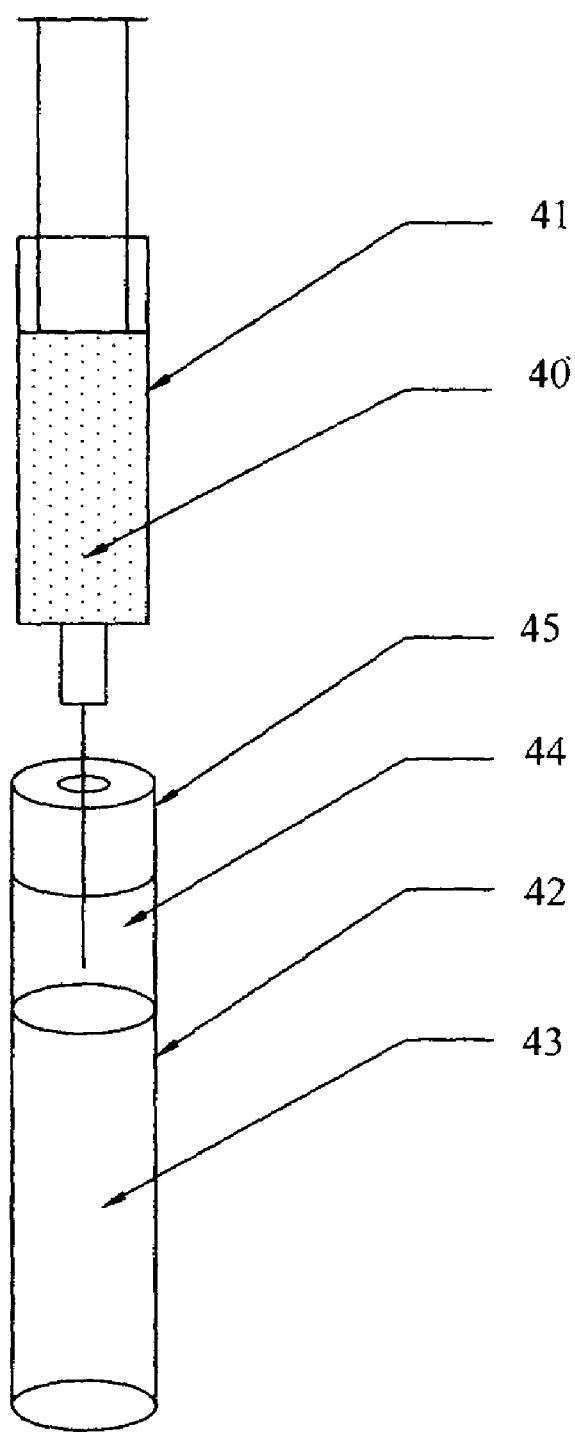
FIG. 10 is a schematic diagram showing the devices used to add butanated water for butane enhanced corn growth in sand using butanated water.

An experiment was conducted to compare corn seed growth in Paver Sand using butane gas injection and butanated water. Paver sand was used to determine if butane enrichment could support corn seed development in a nutrient poor sand (typical arid or desert environment). As shown in FIG. 9, three Nalgene plastic vessels (one for butane gas injection, one for butanated water addition and one for a control), each approximately 11 cm. in diameter and 12 cm. deep, were prepared with three 0.4 cm drainage holes drilled in each base. The butane gas injection vessel was prepared with a 12 cm section of Teflon tubing (see FIG. 2) and connected at one end to a syringe port equipped with Teflon-coated septum for butane injections (Butane Injection vessel). Nine butane injection holes were placed at 1.0 cm intervals along the tubing inside the vessel. FIG. 10 shows the devices that were used for butanated water addition. Butane gas 40 was injected under pressure using a syringe 41 into a 40-ml VOA vial 42 containing 30 ml of distilled water 43, headspace 44, and a cap 45. After butane gas injection into the VOA vial 42 and rigorous shaking, the contents were poured on the sand surface in the appropriate vessel (Butane Water vessel). All three vessels were filled with approximately 800 cm$^3$ of non-sterile Paver Construction Sand Soil.

Each vessel (Butane Injection, Butane Water and Control) contained two corn seeds. A Peaches and Cream Sweet Corn seed and Honey and Cream Sweet Corn seed were placed at the 12:00 and 6:00 positions in each vessel, respectively. The seeds were inserted approximately 5.0 cm below the sand surface. Each vessel was then watered with 100 ml spring water and positioned on its own drainage tray on a shelf approximately 60 cm below two 33 watt grow light tubes (no sunlight) equipped with a timer set for 16 hours light on, 6 hours light off.

Ambient temperature was recorded and water was sprinkled evenly over the soil surface of the Butane Injection vessel and the Control vessel. Butane was injected into the root zone (rhizosphere) through the syringe port of the Butane Injection vessel according to the schedule shown in Table 6. Butanated water was poured onto the sand surface of the Butane Water vessel. The Control vessel received only light and water.

TABLE 6

Butane Injection Schedule

| Day No. | Volume Injected Butane Gas (Butane Injection Vessel) | Volume Butanated Water (Butane Water Vessel) | Water Added (Only Butane Injection and Control Vessels) | Ambient Temperature |
|---|---|---|---|---|
| 1 | 50 ml | 50 ml | 30 ml | 21° C. |
| 2 | 50 ml | 50 ml | 30 ml | 21° C. |
| 3 | 50 ml | 50 ml | 30 ml | 21° C. |
| 4 | 50 ml | 50 ml | 30 ml | 21° C. |
| 5 | 50 ml | 50 ml | 30 ml | 21° C. |
| 6 | 50 ml | 50 ml | 30 ml | 24° C. |
| 7 | 50 ml | 50 ml | 30 ml | 24° C. |
| 8 | 50 ml | 50 ml | 30 ml | 22° C. |
| 9 | — | — | — | — |
| 10 | 50 ml | 50 ml | 30 ml | 21° C. |
| 11 | 50 ml | 50 ml | 30 ml | 21° C. |
| 12 | 50 ml | 50 ml | 30 ml | 21° C. |
| 13 | 50 ml | 50 ml | 30 ml | 21° C. |
| 14 | 50 ml | 50 ml | 30 ml | 21° C. |
| 15 | 50 ml | 50 ml | 30 ml | 21° C. |
| 16 | 50 ml | 50 ml | 30 ml | 21° C. |
| 17 | 50 ml | 50 ml | 30 ml | 21° C. |
| 18 | 50 ml | 50 ml | 30 ml | 21° C. |
| 19 | 50 ml | 50 ml | 30 ml | 25° C. |
| 20 | 50 ml | 50 ml | 30 ml | 25° C. |
| 21 | 50 ml | 50 ml | 30 ml | 25° C. |
| 22 | 50 ml | 50 ml | 30 ml | 25° C. |
| 23 | 50 ml | 50 ml | 30 ml | 25° C. |
| 24 | 50 ml | 50 ml | 30 ml | 25° C. |
| 25 | 50 ml | 50 ml | 30 ml | 25° C. |
| 28 | | Experiment terminated. | | |

— not recorded

Figure 11:
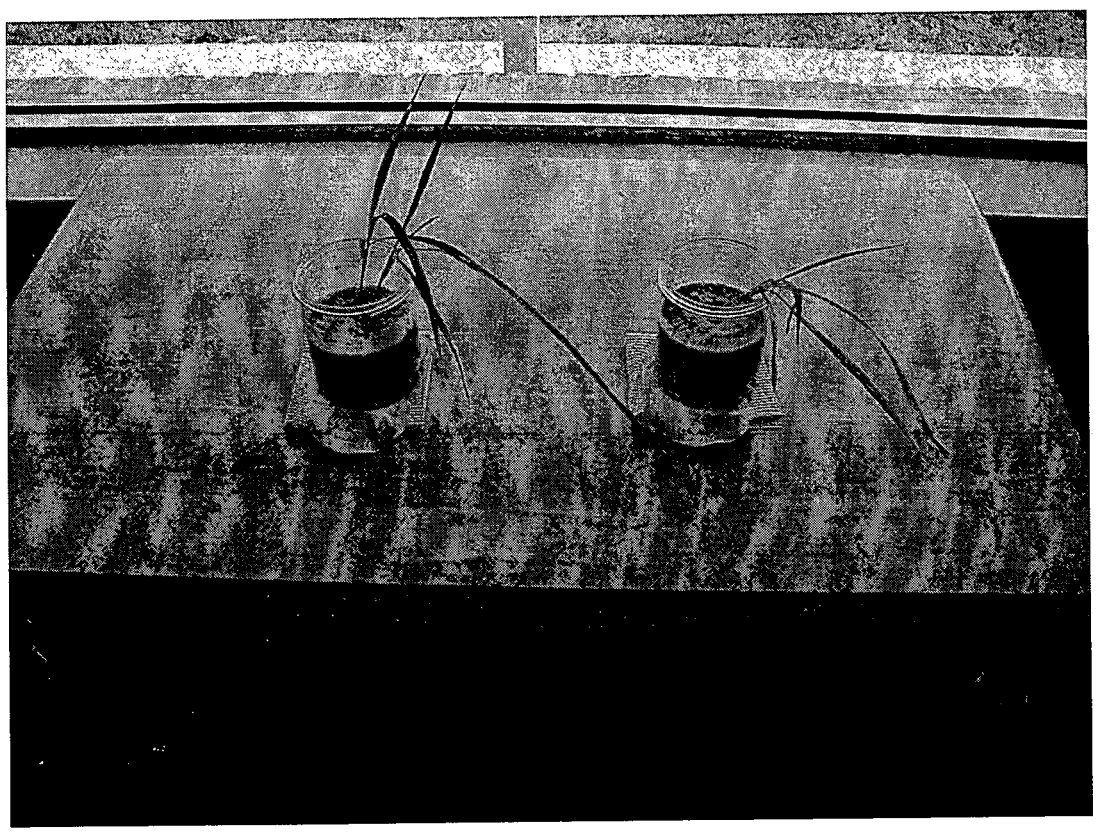
FIG. 11 is a photograph showing control and butanated water seed growth for butane enhanced corn growth in sand using butanated water.

Final seed growth was observed after 28 days. On the final day, a photo was taken showing the Butane Water seed growth as compared with the Control seed growth (FIG. 11).

Figure 12:
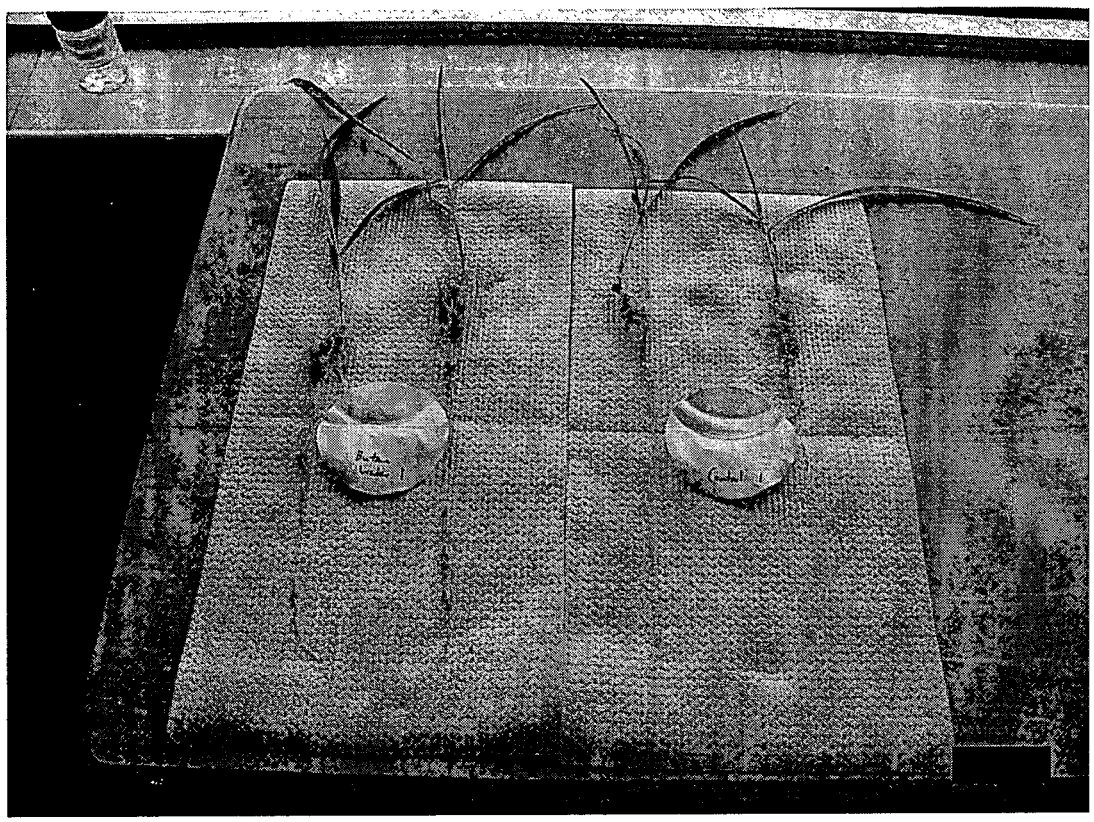
FIG. 12 is a photograph showing control and butanated water root growth for butane enhanced corn growth in sand using butanated water.
Figure 13:
FIG. 13 is a photograph showing control, butanated water, and butane gas injection root growth for butane enhanced corn growth in sand using butanated water.

FIG. 12 shows the same comparison with the plants unearthed. FIG. 13 compares the growth of all three experimental vessels.

The butanated water vessels showed plants with thicker root development and more robust corn plant development as compared with the control plants and the plants that received butane gas through injection.

In conclusion, butane injection enhanced plant, seed and bulb growth. However, butane injection as a liquid could potentially result in damage to crops, germinating seeds or developing plant roots since butane as a liquid flashing to a gas is cold (−0.5° C. boiling point). On the other hand, butane as a gas is difficult to deliver precisely to a root zone without significant losses to the atmosphere. Dissolving butane into water and applying the water to growing plants or seeds is a direct and efficient method to deliver butane into the rhizosphere.

Whereas particular embodiments of this invention have been described above for purposes of illustration, it will be evident to those skilled in the art that numerous variations of the details of the present invention may be made without departing from the invention.

What is claimed is:

1. A method for treating agricultural waste, the method comprising introducing an alkane substrate comprising either butane as the most prevalent compound or propane as the most prevalent compound on a weight percentage basis to agricultural waste, and introducing an oxygen-containing gas to the agricultural waste, to stimulate the growth of alkane-utilizing bacteria which at least partially digest the agricultural waste.

2. The method of claim 1, wherein the alkane substrate comprises butane.

3. The method of claim 1, wherein the alkane substrate comprises butane as the most prevalent compound on a weight percentage basis.

4. The method of claim 1, wherein the alkane substrate comprises propane as the most prevalent compound on a weight percentage basis.

5. The method of claim 1, wherein the agricultural waste comprises animal waste.

6. The method of claim 5, wherein the animal waste comprises manure.

7. The method of claim 5, wherein the animal waste comprises urine.

8. The method of claim 5, wherein the animal waste is provided from at least one animal selected from the group consisting of horses, cows, cattle, pigs, sheep, chickens, goats and turkeys.

9. The method of claim 5, wherein the animal waste is provided in the form of a slurry.

10. The method of claim 1, wherein the agricultural waste comprises vegetable material, leaf material, plant material, composting material and/or waste paper product.

11. The method of claim 1, wherein the oxygen-containing gas comprises air.

12. The method of claim 1, further comprising introducing water to the agricultural waste.

* * * * *

UNITED STATES PATENT AND TRADEMARK OFFICE
CERTIFICATE OF CORRECTION

PATENT NO. : 7,192,523 B2
APPLICATION NO. : 10/674154
DATED : March 20, 2007
INVENTOR(S) : Felix Anthony Perriello It is certified that error appears in the above-identified patent and that said Letters Patent is hereby corrected as shown below:

Title Page 3 Item 56 should read
Other Publications
Arciero et al. "Degradation of Trichloroethylene by the Ammonia-Oxidizing Bacterium Nitrosomonas --Europaea-- "europaea"," Biochemical and Biophysical Research Communications, Mar. 15, 1989; p. 640-643, vol. 159, No. 2.

Alvarez-Cohen et al., Characterization of a Methane-Utilizing Bacterium Consortium That Rapidly Degrades Trichloroethylene and Chloroform, Applied and Environmental --Microbiology Jun.-- "MicrobiologyJun." 1992, pp. 1886-1893, vol. 58, No. 6.

Kim et al., Aerobic Cometabolism of Chloroform and 1,1,1-Trichloroethane by "Butene-Grown" --Butane-Grown-- Microorganisms, Bioremediation Journal, 1997, pp. 135-148, vol. 1, No, 2.

De Bruin et al., "Complete Biological Reductive Transformation of --Tetrachloroethene-- "Tetrachloroethane" to Ethane", Applied and Environmental Microbiology, Jun. 1992, p. 1996-2000, vol. 58, No. 6.

Ye et al., "Anaerobic Dechlorination of Polychlorobiphenyls (Aroclor 1242) by Pasteurized and Ethanol-Treated Microorganisms from Sediments", Applied and Environmental Microbiology, Apr. 1992, p. 1110-1114, vol. 58, No. 4.

Title Page 4 Item 56 should read
--EPA-- "Epa", "Sequential Anaerobic/Aerobic Biodegradation of PCE at Watertown, Massachusetts", Cost and Performance Report, Mar. 2000.

Air & Waste Management Association Show New Products information sheet (posted Jun. 25, 1999) at www.pollutionengineering.com/events/conferences/"awna99" --awma99--/awman6.htm (downloaded Nov. 18, 2002).

Detailed Description
Column 6, Line 29
"...homworts..." should read --...hornworts...--

UNITED STATES PATENT AND TRADEMARK OFFICE
CERTIFICATE OF CORRECTION

| | | |
|---|---|---|
| PATENT NO. | : 7,192,523 B2 | Page 2 of 2 |
| APPLICATION NO. | : 10/674154 | |
| DATED | : March 20, 2007 | |
| INVENTOR(S) | : Felix Anthony Perriello | |

It is certified that error appears in the above-identified patent and that said Letters Patent is hereby corrected as shown below:

Column 8, Line 25 should read
"...tray on a "self" --shelf-- approximately 60 cm below two 33 watt grow..."

Signed and Sealed this

Twenty-fifth Day of March, 2008

JON W. DUDAS
*Director of the United States Patent and Trademark Office*